Feb. 28, 1961 F. LE ROY DAVIS 2,972,810
DEVICE FOR COMPUTING AREAS AND VOLUMES
Filed Dec. 17, 1956 5 Sheets-Sheet 1

INVENTOR.
FRANKLIN L. DAVIS
BY
ATTY.

Feb. 28, 1961 F. LE ROY DAVIS 2,972,810
DEVICE FOR COMPUTING AREAS AND VOLUMES
Filed Dec. 17, 1956 5 Sheets-Sheet 2
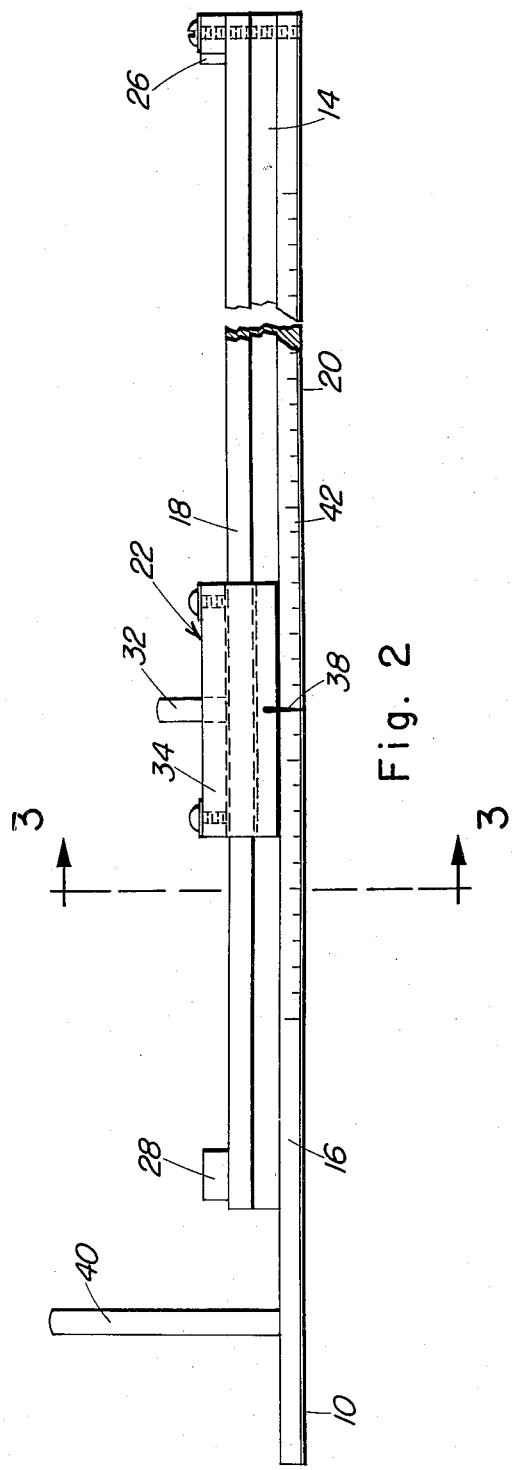
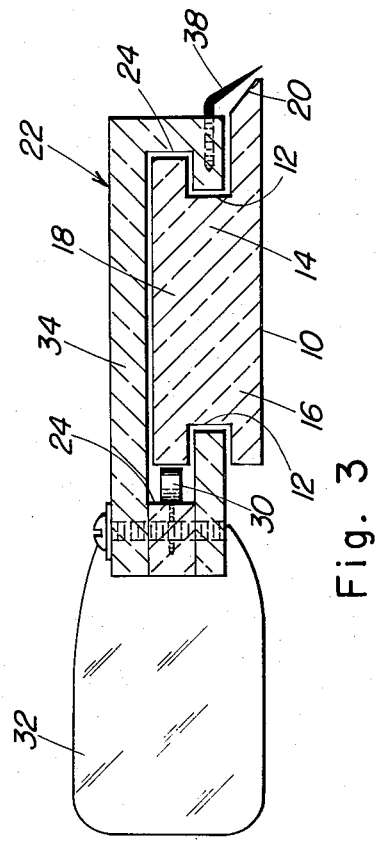
INVENTOR.
FRANKLIN L. DAVIS
BY
ATTY.

INVENTOR.
FRANKLIN L. DAVIS
BY
ATTY.

Feb. 28, 1961 F. LE ROY DAVIS 2,972,810
DEVICE FOR COMPUTING AREAS AND VOLUMES
Filed Dec. 17, 1956 5 Sheets-Sheet 4

INVENTOR.
FRANKLIN L. DAVIS
BY
ATTY.

Feb. 28, 1961  F. LE ROY DAVIS  2,972,810
DEVICE FOR COMPUTING AREAS AND VOLUMES
Filed Dec. 17, 1956  5 Sheets-Sheet 5
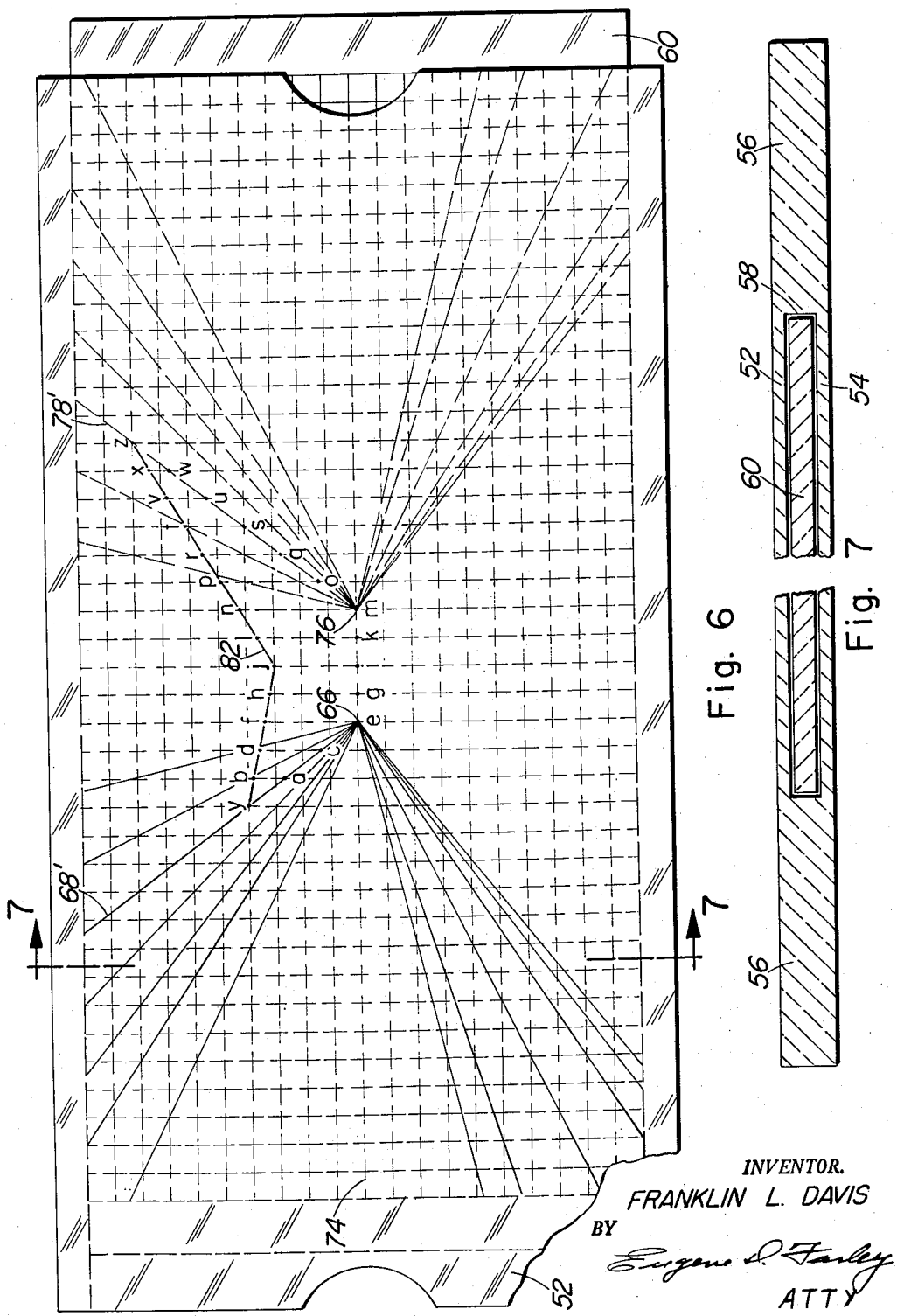
INVENTOR.
FRANKLIN L. DAVIS
BY
Eugene D. Farley
ATTY

United States Patent Office 2,972,810
Patented Feb. 28, 1961

2,972,810

DEVICE FOR COMPUTING AREAS AND VOLUMES

Franklin Le Roy Davis, 3811 NE. 36th Ave., Portland, Oreg.

Filed Dec. 17, 1956, Ser. No. 628,663

1 Claim. (Cl. 33—1)

This invention pertains to computing devices, and relates particularly to a device for computing areas and volumes. The device has particular utility in highway design and construction for the computing of quantities of excavation and embankment.

In accordance with present methods in highway design and construction, it is a general practice in the computing of quantities of excavation and embankment to make section surveys at intervals along the line of the intended highway, most commonly taken at intervals of fifty feet, and then to reduce these surveys to scaled graphic plots. Upon these plots also are scaled the elevation and dimension of the roadway and the excavation or embankment slopes. The section area defining the excavation or embankment then is computed by means of planimeter tracings or by methods involving electronic computers. However, neither of these methods is completely satisfactory, since each presents certain disadvantages: Use of the planimeter is laborious and involves considerable time, and the degree of accuracy obtainable is less than that desired, thereby limiting its use to preliminary design work only. On the other hand, the use of electronic computers is extremely costly, requiring expensive, non-portable equipment and specially trained personnel.

Accordingly, it is the principal object of this invention to provide a device by which to measure areas and volumes with speed, facility and desired accuracy.

Another important object of this invention is to provide a device by means of which to compute the area or volume of any configuration.

Still another important object of the present invention is to provide a device for computing areas and volumes, by which device there is eliminated the prior need to plot the area on cross section paper.

A still further important object of the present invention is to provide a device having particular utility in computing areas and volumes of excavations or embankments in estimating earth work quantities in highway design and construction, and wherein said device eliminates the prior necessity of inking in the ground line on survey section plots.

A still further important object of this invention is to provide a device for computing areas and volumes, which device is of simplified construction for economical manufacture.

The foregoing and other objects and advantages of this invention will appear from the following detailed description taken in connection with the accompanying drawings in which:

Figure 2 is a foreshortened view in side elevation of the slide rule shown in Figure 1;

Figure 3 is a sectional view taken along the line 3—3 in Figure 1;

Figure 6 is a plan view of the template assembly and showing the same arranged upon a highway survey section plot, the latter being indicated by dot-and-dash line; and Figure 7 is an enlarged foreshortened sectional view taken along the line 7—7 in Figure 6.

Figure 1:
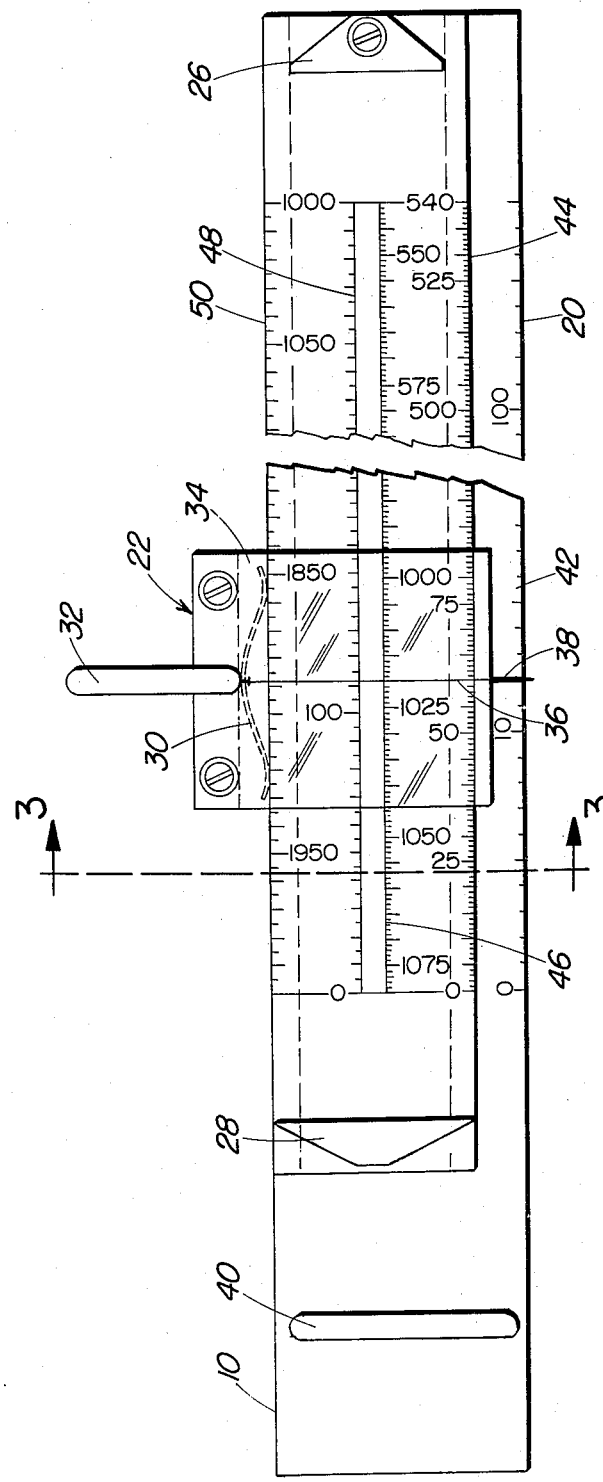
Figure 1 is a foreshortened plan view of a slide rule embodying features of the present invention.

The slide rule illustrated in Figures 1, 2 and 3 includes an elongated base 10 having a substantially I-shaped cross section formed by grooves 12 in the lateral sides of the base. Thus, an intermediate section 14 interconnects vertically spaced lower and upper base sections 16, 18, respectively. One edge of the lower base section is tapered, providing a rule edge 20.

The slide rule also includes a slide member 22 provided with a longitudinal groove 24 which conforms with the cross sectional profile of the intermediate section 14 and top section 18 of the elongated base. In this manner the slide member is mounted upon the base for sliding movement longitudinally of the latter. Stop members 26, 28 are mounted upon the elongated base adjacent the upper and lower ends of the latter, respectively, to limit the movement of the slide member. The upper stop member preferably is detachable from the base to permit removing the slide member for purposes of cleaning, repair or replacement.

In accordance with conventional practice, a spring 30 is secured to the slide member and is interposed between the latter and the adjacent edge of the top section 18 of the elongated base, to frictionally retain the slide member in any position of adjustment along the base. A handle 32 is provided on the slide member to facilitate manipulation of the latter.

The top portion 34 of the slide member is transparent, being provided either by making the slide member entirely of transparent plastic, as illustrated, or by providing a separate transparent top portion. In any case, the transparent top is provided with a transverse index line 36. Projecting laterally from the slide member on the side opposite the handle is a pointer 38. As indicated, this pointer is aligned with the index line and overlies the rule edge 20 of the base.

Manipulation of the slide rule base is facilitated by means of a handle 40 projecting upwardly from the lower end thereof.

The slide rule illustrated in the drawings has particular utility in the computation of areas and volumes of excavations or embankments, in highway design and construction. Since the survey section plots mentioned hereinbefore generally are scaled 1 inch equals 10 feet, the graduated scale 42 provided on the rule edge 20 of the base is proportioned to correspond therewith. Thus, this scale is proportioned and marked to indicate 10 feet per inch, with each inch subdivided into ten parts.

A scale 44 is provided on the top section 18 of the elongated base adjacent the edge facing the rule edge. This scale represents area. As will be discussed more fully hereinafter, the computation of areas from highway survey section plots preferably involves measurements with the slide rule of the length of lines spaced apart at half-inch intervals. Accordingly, since such plots are scaled 1 inch equals 10 feet, or one-half inch equals 5 feet, the area scale 44 is proportioned and designated 50 square feet per inch, as indicated.

A second area scale 46 is positioned adjacent the first area scale and is provided with area designations which continue numerically from the markings on the first scale, but preferably in the opposite direction. Thus, the area designations on the first scale range from zero to 540 square feet toward the upper end of the rule, and the area designations on the second area scale range from 540 to 1080 square feet toward the bottom end of the rule. It will be apparent that the provision of the two area scales, arranged as herein described, effectively doubles the range of the slide rule within the longitudinal dimensions of the base. In other words, if the two area scales were combined as a single scale, the elongated base necessarily would be twice as long as illustrated.

As explained hereinbefore, it is desirable in highway design and construction that quantities of excavation and embankment be computed in terms of volume, preferably cubic yards. Since it is the general practice to prepare survey section plots at intervals of 50 feet along the intended line of the highway, it is convenient to compute quantities of excavation and embankment by multiplying the area determined from a section plot, by 50 feet and converting to cubic yards. For convenience, there is provided on the top section 18 of the slide rule a first volume scale 48 which is associated with the first area scale 44, and a second volume scale 50, which is associated with the second area scale 46.

Although the slide rule described hereinbefore may be used directly upon section plots, it is necessary in such event that the plots be made upon paper which is cross sectioned, for example at half-inch intervals. In order to eliminate the work of plotting the cross section and the excessive cost of cross section paper and to permit the section plots to be made upon inexpensive, unsectioned paper, there is provided in accordance with this invention a template having the preferred construction illustrated in Figures 4–7, inclusive.

Figure 4:
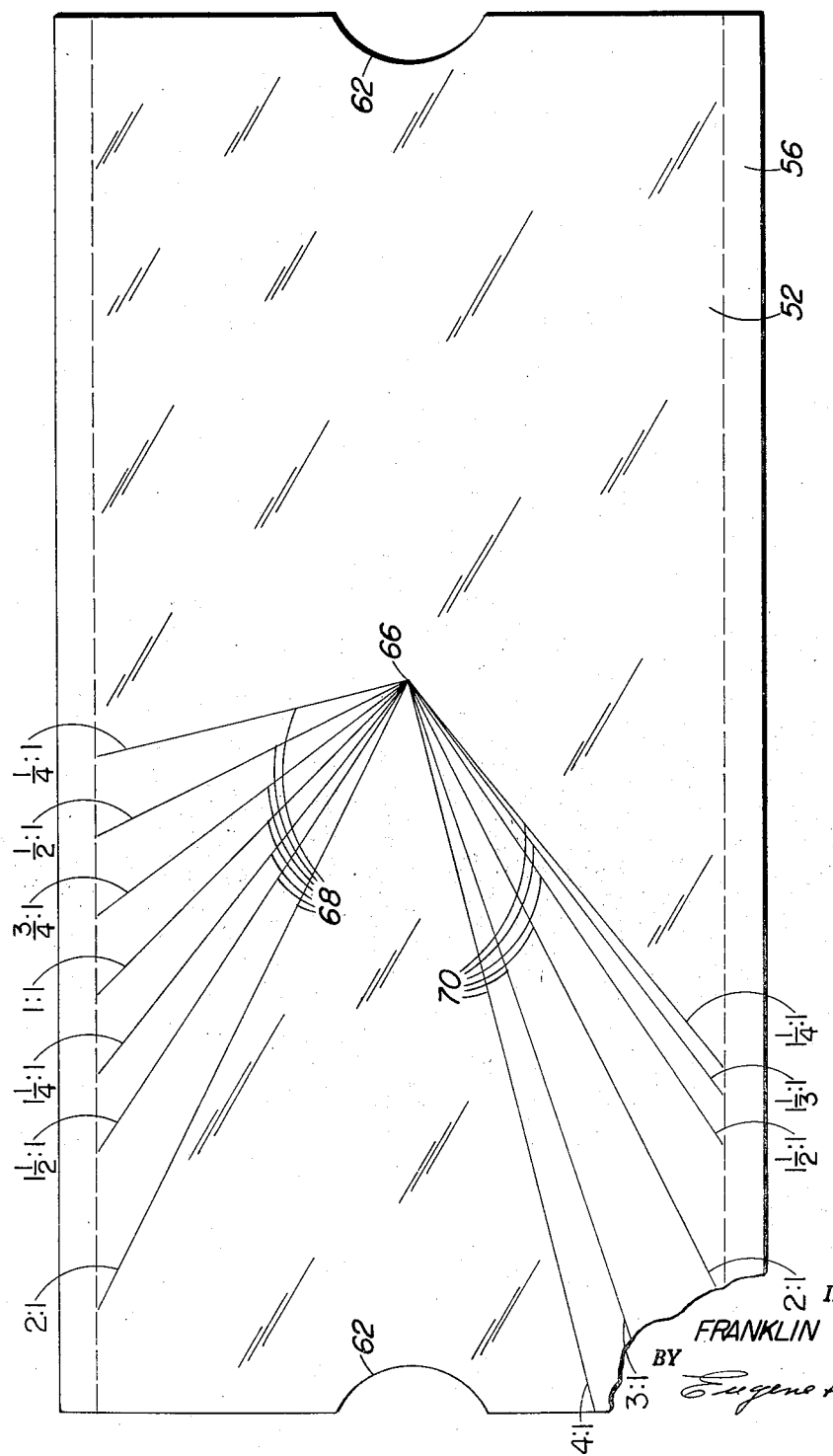
Figure 4 is a plan view of the top plate section of a template adapted particularly for use with the slide rule of Figure 1 for computing areas and volumes of excavations or embankments in highway design and construction.

The template includes a cover plate member which, in the preferred embodiment shown in Figures 4 and 7, comprises a top plate 52, a bottom plate 54 spaced therefrom, and the interconnecting side sections 56. As illustrated, the cover plate member is formed as a unitary structure of transparent material, preferably synthetic plastic. The top, bottom and sides of the cover plate member form a central longitudinal slot 58 adapted to receive and guide a slider member 60, shown in Figures 5 and 7. The slider member 60 also comprises a sheet of transparent material, preferably synthetic plastic. Thumb notches 62 are provided in the opposite ends of the cover plate member for convenience in gripping the ends of the slider member by the fingers, to facilitate manipulation of the template elements.

Referring particularly to Figure 4 of the drawings, there is inscribed upon the left hand half of the top plate 52 a plurality of lines which diverge from a common point 66 located at the approximate center of the top plate. Thus, projecting upwardly to the left from point 66 are a plurality of slope lines 68 which function to designate various angles of cut to be excavated from the left hand side of the roadway. Also originating at the point 66 and projecting downwardly to the left therefrom are a plurality of slope lines 70 designating various angles of embankment to be filled at the left side of the roadway.

Figure 5:
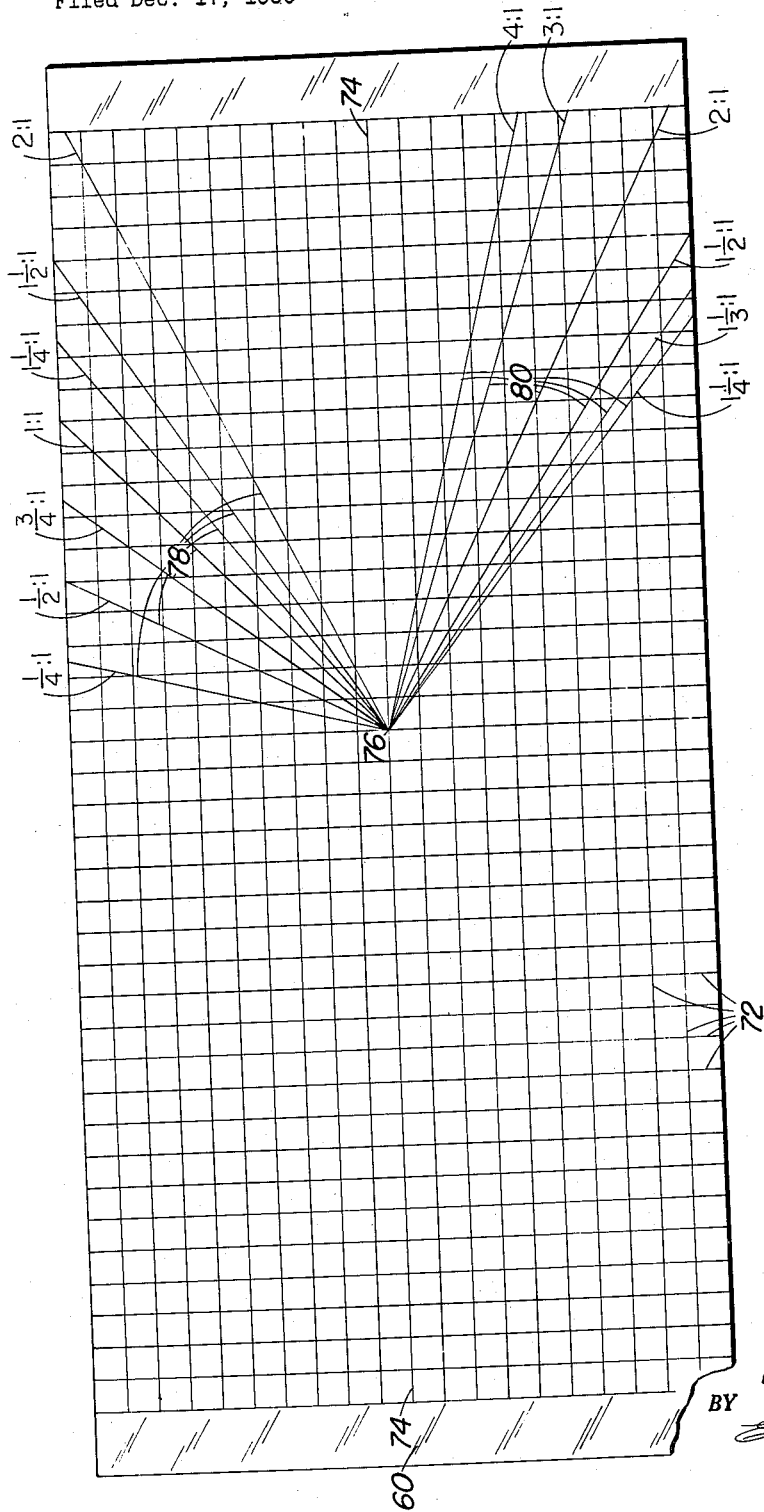
Figure 5 is a plan view of the slider section of the template for cooperative use with the top plate section shown in Figure 4.

Referring now to Figure 5 of the drawings, the slider member 60 is provided with cross section markings 72 extending longitudinally and transversely thereof and spaced one-half inch apart. The slider member also is provided with a base line 74 extending the full length of its longitudinal center line.

Originating at the common point 76 at the approximate center of the slider member and extending to the right therefrom are a plurality of lines. Thus, slope lines 78 project upwardly to the right and, as explained more fully hereinafter, they cooperate with the upper slope lines 68 on the top plate, and function to indicate various angles of slope for the right hand excavation cut.

Additional slope lines 80 originate from point 76 and project downwardly to the right therefrom to indicate various angles of embankment for fills on the right hand side of the roadway.

Referring now to Figure 6 of the drawings, the cover member and slider member of the template are shown assembled for mutual cooperation and arranged upon a survey section plot prepared for a proposed highway construction. For purposes of the following description of operation of the computer of this invention, let it be assumed that the template elements have been arranged on the section plot to provide the desired roadway elevation and width, with respect to the survey ground line 82. Thus, the base line 74 of the template has been positioned on the desired roadway elevation and the origination points 66, 76 on the top plate and slider member, respectively, have been adjusted to indicate the left and right shoulders, respectively, of the highway. The roadway is to be 20 feet wide between shoulders, as indicated. Assume further, that the excavation slopes which extend upwardly from the shoulders to the ground line 82 at opposite sides of the roadway are to be three-fourths to one, indicated by the slope lines 68' and 78', respectively. Thus, with these conditions established, it is desired to determine the volume of earth to be excavated within the area $y$, $e$, $m$, $z$, $j$, $y$, that is the area bounded by the roadway, the diverging slope lines 68', 78' and the ground line 82, for a distance of 50 feet, extending 25 feet in both directions from the survey section plot.

The foregoing area is calculated with the aid of the slide rule described hereinbefore, in the following manner: The slide element 22 of the rule is moved to the extreme lower end of the elongated base, where the pointer 38 registers with the zero mark of scale 42 of the rule edge. The rule then is placed upon the template with the rule edge 20 aligned with the vertical cross section line 72 on which are located the points $a$, $b$. The zero mark of the rule scale 42 is placed at point $a$, which is the intersection of the left hand slope line 68' with the vertical cross section line. The slide element of the rule then is moved upwardly, by manipulation of the handle 32, until the slide pointer 38 registers with point $b$, which is the intersection of the ground line 82 and the vertical cross section line. With the pointer of the slide member of the rule held in this attained position on the base by means of the spring 30, the slide rule then is moved bodily to the next adjacent vertical cross section line with the pointer 38 placed at point $c$. The slide element of the rule then is moved upwardly until the pointer 38 registers with point $d$. This procedure is continued to measure, preferably in sequence, the distances between the points $e$, $f$; $g$, $h$; $i$, $j$; $k$, $l$; $m$, $n$; $o$, $p$; $q$, $r$; $s$, $t$; $u$, $v$; and $w$, $x$.

In the example illustrated, it will be noted that the slide element of the rule reaches the upper limit of its travel during the measurement of the distance between points $o$, $p$. Since, in the embodiment illustrated, the second area and volume scales 46 and 50, respectively, are marked to increase in magnitude toward the bottom end of the rule, continued measurement of distance is made by placing the pointer 38 at the upper points on the ground line 82 and moving the slide element 22 downward to the associated points on the right hand slope line 78'.

When the final distance between points $w$, $x$ has been measured, the total area within the boundaries designated will be indicated on the second area scale 46 under the index line 36 on the slide element of the rule, to be 787.5 square feet. Since it has been assumed that the volume to be excavated extends 25 feet in opposite directions from this section plot, the volume of excavation is found on the second volume scale 50 under the index line 36 on the slide element of the rule, to be 1458 cubic yards.

As explained hereinbefore, the foregoing procedure is repeated for each successive survey section plot taken along the intended line of the highway. Accordingly, in some instances the roadway may be at an elevation above the ground line, thereby necessitating a fill. In such event, the lower sets of slope lines 70, 80 are utilized to define the fill embankment, and the area and volume are computed in the same manner as the excavation problem illustrated above.

Although the present invention has been described and illustrated herein with particular reference to survey section plots for highway construction, it will be apparent to those skilled in the art that the computer may be used for numerous other purposes as, for example, the computation of areas of real estate, timber stands, and many other circumstances involving the computation of areas or volumes. The template is useful in all circumstances in which an area may be defined by vertically spaced lines interconnected by horizontally spaced lines.

It is believed to be apparent that the present invention affords simplified and inexpensive means by which to compute areas and volumes with speed and facility and with a degree of accuracy heretofore attainable only with extremely costly computing equipment. The device of this invention may be used by unskilled persons, with a minimum of training. Although the slide rule may be used alone on section plots prepared on cross section paper, the provision of the template assembly described hereinbefore eliminates the necessity of such cross section paper. Moreover, in the computing of volumes for highway construction, the only section plot required is the ground line, for the template provides the roadway width and elevation and the cut or embankment slopes. Thus, trial computations may be made in balancing cuts and embankments without defacing or removing the plotted ground line, even when the latter is plotted as a pencil line.

It will be apparent to those skilled in the art that the various details of construction described hereinbefore may be modified to suit particular needs or desires. For example, the horizontal lines 72 of the cross section pattern may be eliminated since, in most instances, measurements between points will be made on the vertical lines. As another example, the base line 74 may be eliminated since, in any event, the points 66, 76 of origin of the slope lines are positioned on a longitudinal line common to both top plate 52 and slider plate 60, and the variable distances between these points define the width of a roadway.

As still another example of modification, the spacing between lines 72 of the cross section may be varied, as desired, provided the survey section plot and the area and volume scales of the slide rule are modified correspondingly. The slide rule scale 42 may be omitted, if desired. Accordingly, it is to be understood that the foregoing description is primarily illustrative, and that the scope of this invention is defined by the subjoined claim.

Having now described my invention and the manner in which the same may be used, what I claim as new and desire to secure by Letters Patent is:

A template comprising a pair of superimposed relatively slidable plates, the plates having guide means constraining them to translational sliding motion parallel to a predetermined axis of one of the said plates; said plates being adapted for viewing a registering plot of a transverse profile of an area to be built up or cut away, one of said plates having marked thereon a coordinate grid having one axis coincident with said predetermined axis and also having thereon a plurality of slope lines originating at an intersection point of the grid near the middle and on said axis, the slope lines diverging from each other and lying to one side of a plane normal to said axis through said point; and the other of said plates having thereon a plurality of slope lines originating at a second point on said axis spaced to the other side of said intersection point and diverging oppositely to said first plurality and to the opposite side of a plane normal to said axis through said second point and wherein said plates are transparent.

References Cited in the file of this patent

UNITED STATES PATENTS

| | | |
|---|---|---|
| 1,581,047 | Folson | Apr. 13, 1926 |
| 1,937,831 | McCollum | Dec. 5, 1933 |
| 2,304,327 | Anderson | Dec. 8, 1942 |
| 2,382,064 | Judd | Aug. 14, 1945 |
| 2,456,676 | Chowns | Dec. 21, 1948 |
| 2,487,690 | Black et al. | Nov. 8, 1949 |